United States Patent

[11] 3,601,613

| [72] | Inventor | Fromund Hock<br>Wetzlar, Germany |
|---|---|---|
| [21] | Appl. No. | 16,776 |
| [22] | Filed | Mar. 5, 1970 |
| [45] | Patented | Aug. 24, 1971 |
| [73] | Assignee | Ernst Leitz GmbH<br>Wetzlar, Germany |
| [32] | Priority | Mar. 10, 1969 |
| [33] | | Germany |
| [31] | | P 19 11 956.3 |

[54] PHOTOELECTRIC APPARATUS FOR DETERMINING THE DISPLACEMENT OF AN OBJECT
15 Claims, 3 Drawing Figs.

[52] U.S. Cl............................................. 250/205,
250/217, 250/224, 250/225, 250/230, 356/141, 356/152
[51] Int. Cl....................................................... G01j 1/32, G01b 11/26
[50] Field of Search........................................... 250/205, 207, 217, 221, 224, 225, 230, 231, 236; 356/138, 141, 152

[56] References Cited
UNITED STATES PATENTS

| 2,948,890 | 8/1960 | Barth et al. ................... | 250/221 X |
| 3,432,671 | 3/1969 | Edmonds...................... | 250/217 |

Primary Examiner—Archie R. Borchelt
Assistant Examiner—A. L. Birch
Attorney—Krafft and Wells ABSTRACT: In a photoelectric apparatus for determining the displacement of an object the image of a slit is projected onto a reflector attached to the object. A beam splitter is arranged for dividing the reflected image into two equal portions and for directing the portions into two different reception channels. Photoelectric receivers are associated with each reception channel which receivers are responsive to the intensity of the light impinging thereon. A summing amplifier and a differential amplifier are connected to the photoelectric receivers and are interconnected with one another for producing an output signal when the object is displaced; the amplitude of the signal corresponding to the displacement of the object.

FROMUND HOCK
INVENTOR

BY Krafft & Wells

PHOTOELECTRIC APPARATUS FOR DETERMINING THE DISPLACEMENT OF AN OBJECT

BACKGROUND OF THE INVENTION

1. Field of the Invention

The present invention relates to an apparatus for determining the lateral and/or angular displacement of an object by means of pulses generated by photoelectric receivers.

2. Description of the Prior Art

In the Pat. No. 31,936 of the German Democratic Republic there is disclosed a photoelectric scanning device for measuring object displacements which device is independent from a current mains supply and which operates in dependence on the changes of the light reflected from the object to be measured. However, quantitative measurements cannot be performed with this device.

In the laid-open Pat. Application No. 1,145,807 of the German Federal Republic there is disclosed a device for measuring the displacement of a movable object relative to a reference system. A grating and the image of this grating are displaced relative to one another whereby pulses are generated. The number of the pulses provide a measure for the displacement within a certain time unit. Further, it is already known from the laid-open Pat. Application No. 1,281,158 and No. 1,241,128 of the German Federal Republic to project a luminous slit image on a grating and to utilize the resulting light modulation for measuring purposes. However, such devices operate according to principles which are totally different from the principle underlying the present invention.

In the laid-open Pat. Application No. 1,273,210 of the German Federal Republic a device for photoelectrically determining the position of two parts relative to one another is described which device makes use of the beam of a light source as defined by a slit and of two light sensitive elements in a bridge circuit. This device serves as a zero pulse generator.

In a further laid-open Pat. Application No. 1,089,561 of the German Federal Republic there is disclosed a device for a noncontacting precision measurement of changes of the position of an object which is being moved in the direction of the optical axis of an imaging optical system. The light emitting from a luminous spot on the object is divided by a beam splitter and directed to two photoelectric elements. However, such a device cannot be used for determining displacements lateral to the optical axis or for determining changes in the angular position.

In the laid-open Pat. Application No. 1,207,640 of the German Federal Republic there is disclosed a device for photoelectrically determining the position of an object which is adjustable relative to a reference position. In this device the object must be provided with a roof prism. The luminous slit of an aperture plate is imaged on this roof prism which directs the light onto two photoelectric elements for generating corresponding electric pulses. However, it is a disadvantage of this device that the spacing of the roof prism from the luminous slit must be exactly maintained and that the device is susceptible to dirt accumulation.

It is therefore an object of the present invention to provide a photoelectric apparatus for determining the displacement of an object which has none of the above-mentioned disadvantages. It is a further object to provide an apparatus which is simple in design and can therefore be manufactured at relatively low costs.

SUMMARY OF THE INVENTION

The above stated objects are attained by providing a photoelectric apparatus for determining displacements of an object, which comprises means for projecting an image of a slit to be reflected by a reflector attached to the object, a beam splitting device directing the reflected image into two reception channels so that the reflected image is divided between the reception channels according to the position of incidence of the reflected image on the beam splitting device, photoelectric means associated with the reception channels responsive to the intensity of light entering each reception channel, a summing amplifier and a differential amplifier each coupled to the photoelectric means, wherein the summing amplifier controls the differential amplifier in a manner such that light of the reflected image arriving entirely in one of the two reception channels causes the differential amplifier to produce an output signal of predetermined amplitude, and wherein when the object is displaced the differential amplifier supplies an output signal having an amplitude which corresponds to the displacement of the object in a manner such that throughout the measuring range the steepness of the discriminator curve at the output of the differential amplifier is always constant.

The photoelectric means may comprise a photoelectric cell allocated to each reception channel. Alternatively, the photoelectric means may comprise a single photoelectric cell alternately allocated to each reception channel.

Preferably, the summing amplifier controls an illumination source of the projecting means in a manner that the amplitude of the output signal of the summing amplifier remains constant.

Preferably, an objective lens provided in the projecting means and the reflector are arranged for autocollimation.

The projecting means may comprise an illumination source, a condenser lens and an objective lens arranged for projecting the slit image onto the reflector, the slit being arranged between the condenser lens and the objective lens.

Preferably, a beam divider is arranged between the slit and the objective lens for directing the reflected slit image onto the beam splitting device.

According to one embodiment for measuring angular displacements of an object such as a diffraction grating, the objective lens is a telescope objective and the reflector attached to the object is a plane mirror.

According to a second embodiment, for measuring lateral displacements of the object, the objective lens is a microobjective and the reflector attached to the object comprises a part-spherical mirror.

In a modification, the reflector comprises a concave mirror which serves at the same time as an objective forming the image of the slit. Alternatively, the reflector comprises a mirror lens which serves at the same time as an objective forming the image of the slit.

Preferably, in order to increase the illumination incident on the beam splitting device the beam divider may be a polarizing divider, and an optical polarizing component which rotates the polarization of the slit image through 90° is arranged in the image path between the beam divider and the reflector. The optical polarizing component may comprise a plate or a Faraday cell. However, the beam divider may comprise a geometrical beam divider.

BRIEF DESCRIPTION OF THE DRAWINGS

The invention will be more readily comprehended from the following description when taken in conjunction with the appending drawings, wherein.

DESCRIPTION OF THE PREFERRED EMBODIMENTS

Figure 1:
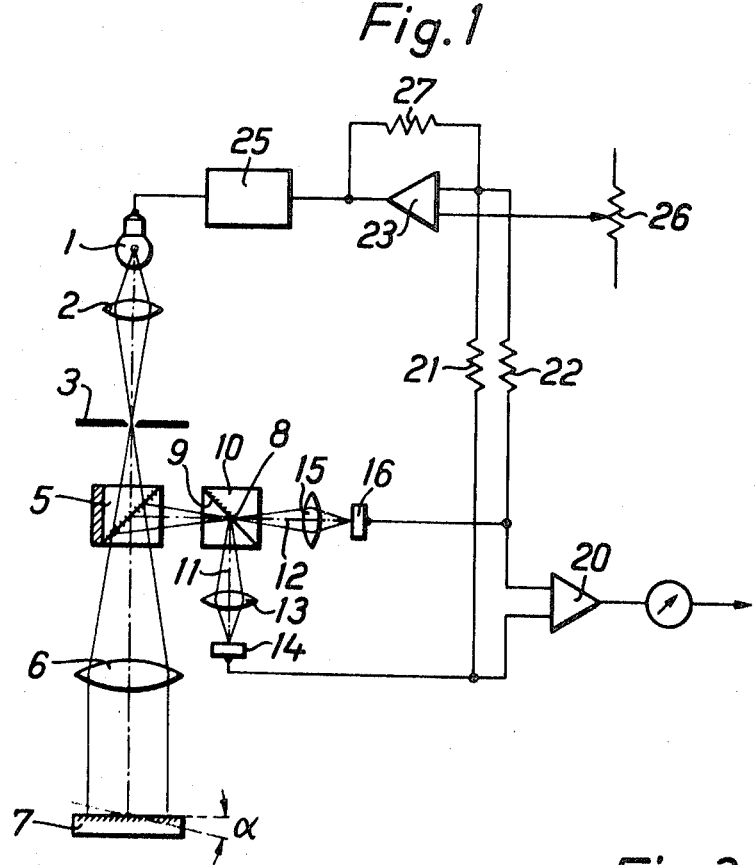
FIG. 1 shows a photoelectic apparatus according to the invention for determining the angular displacement of a measuring slide.

Referring now to the drawings, in FIG. 1 there is shown a lamp 1 which illuminates a slit 3 via a condenser lens 2. A fiber optics device with disarranged fibers may be arranged between the light source 1 and the condenser 2. By employing the fiber optics device, it is possible to render the distribution of light in the slit substantially independent of fluctuations of the intensity of the lamp and to minimize heating of the optical components which determine the zero point stability. A slit image follows an image path from the slit 3 through a dividing cube 5 and from there passes on to an objective lens 6. The objective lens 6 is designed as a telescopic objective lens 6 and throws the beam of light on to a reflector comprising a plane mirror 7 attached to a measuring slide the position of which is to be determined. The objective lens 6 and the plane mirror 7 are arranged for autocollimation so that the slit image is reflected to the beam dividing prism 5 from which it is directed to the beam splitting surface 9 of a beam splitting prism 10. In order to increase the illumination incident on the prism 10, it is advantageous for the dividing prism 5 to be a polarizing prism and to provide a polarizing device which is arranged in the image path between the dividing prism 5 and the mirror 7. The polarizing device may be a λ/4 plate or a Faraday cell which rotates the polarization of the imaging light through 90° so that the total useful light reflected from the mirror 7 is directed from the dividing prism 5 to the beam splitting surface 9.

When the plane mirror 7 is aligned exactly at right angles to the optical axis of the objective lens 6, then one-half of the slit image 8 is incident on a reflecting part of the beam splitting surface 9 and the other half of the slit image 8 is incident on an immediately adjacent nonreflecting part of the beam splitting surface 9. With this arrangement light from one half of the slit image 8 is directed to a receiver channel 11 and light from the other half of the slit image 8 is directed to a receiver channel 12. In the receiver channel 11 there is a collecting lens 13 which forms an image of the pupil of the objective lens 6 on a photoelectric cell 14. Similarly, the receiver channel 12 is provided with a collector lens 15 which forms a similar image of the pupil of the objective 6 on a photoelectric cell 16. The photoelectric cells 14 and 16 are preferably photodiodes so arranged that a linear conversion characteristic is obtained when the photodiodes operate by suppression.

The photoelectric cells 14 and 16 produce electric signals which are fed to a differential amplifier 20 and to a summing amplifier 23. The coupling between each photoelectric cell 14, 16 and the summing amplifier preferably includes summing resistors 21 and 22 respectively, which bring the signals from each photoelectric cell to the same channel gradient. The summing amplifier is preferably an OP amplifier with its input coupled to its output via a feedback resistance 27 to produce negative feedback. The output of the summing amplifier 23 is employed to control a power pack 25 for the lamp 1 in such a way that the output level of the summing amplifier 23 corresponds to a predetermined value. Preferably, the predetermined value of the output level may be regulated, by means of a resistor 26.

Figure 2:
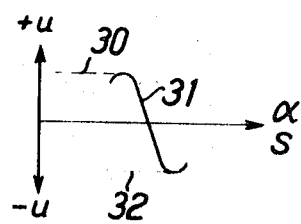
FIG. 2 shows graphically an output signal from the differential amplifier of the apparatus shown in FIG. 1, i.e. a discriminator curve.

Consequently, when the slit image 8 is located entirely on the beam splitting surface 9, so that only the reception channel 11 receives light and the reception channel 12 is dark, then the output signal of the differential amplifier 20 (see FIG. 2) assumes a constant amplitude 30.

If the mirror 7 is now tilted through an angle $\alpha$, then part of the slit image 8 moves onto the nonreflecting part of the beam splitting surface 9; consequently, a part of the light from the image 8 also reaches the reception channel 12. In response the differential amplifier emits an output signal which as the angle of tilt $\alpha$ is increased passes through zero for a given ratio of the luminous flux distribution between the two reception channels 11 and 12, preferably for equipartition. Thus, it can be seen from FIG. 2 which actually shows a discriminator curve that the amplitude of the output signal depends only on the angle of tilt $\alpha$. In the curve which represents the signal amplitude $u$ against the angle of tilt $\alpha$ a characteristic 31 is obtained with a gradient which is stabilized by the lamp control circuit. If the proportion of the intensity passing through the reception channel 12 becomes greater than that through the reception channel 11, then the sign of the signal at the output of the differential amplifier is reversed. Finally, if the entire intensity of the beam of the slit image 8 passes into the reception channel 12, then the output signal of the differential amplifier 20 has a constant amplitude 32.

The apparatus described therefore operates in such a way that the characteristic 31 remains independent of variations in the photometric properties of the apparatus from the lamp 1 up to the separation into the two reception channels.

Variations in the photometric properties of the apparatus can occur owing to distribution of partial light fluxes to the reception channels, aging of the lamp, and variations in the surface properties of the reflector.

Instead of correcting for these variations by means of a lamp control circuit, the output signal of the summing amplifier may also be employed to control the amplification factor of the differential amplifier in such a way that the amplification factor of the differential amplifier is controlled approximately in proportion to the sum of the signals from the photoelectric cells.

In a preferred embodiment of the apparatus described with reference to FIG. 1, the mirror 7 is mounted on a measuring slide and the signal supplied by the differential amplifier 20 serves as a correction signal for correcting the angular tilt of this measuring slide. As a result of defects in machining, in fact, measuring slides cannot be displaced in a manner completely free from error, so that the measuring errors caused by small tilts during the displacement of this measuring slide can be corrected by means of this angular error signal, which is particularly important when the measuring slide is part of an arrangement operating on the Abbe principle.

Figure 3:
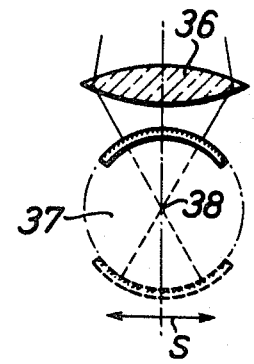
FIG. 3 shows a modification to part of the apparatus shown in FIG. 1 which enables lateral displacements of the measuring slide to be determined.

In FIG. 3 there is shown a modification of FIG. 1 in which the lens 6 is replaced by a microobjective 36 which cooperates with a part spherical mirror 37 replacing the plane mirror 7. The center of a sphere 38 is located in the plane in which the objective 36 forms the image of the slit 3. The part spherical mirror 37 may be convex (shown in solid lines) and located between the center 38 and the objective 36. Alternatively, the mirror 37 may be concave (shown in broken lines) in which case it is located on the other side of the center point 38, as seen from the objective 36. The mirror 37 is connected with the object whose change in position it is desired to determine. In the event of small lateral changes in position of the object and consequently of the spherical mirror 37, the slit image 8 (FIG. 1) moves outwards sideways and the effects occur which have been described in connection with tiltings of the mirror 7. The abscissa in FIG. 2 accordingly applies for lateral displacements. The apparatus shown in FIG. 1 and modified as described with reference to FIG. 3 can therefore be used for determining small changes in lateral position, similar to those in a photoelectric microscope observing an index calibration, in which after the fitting of the mirror 37 on to the object to be measured a noncontact measurement is obtained which is insensitive to dust, since there is no index on the object.

Instead of employing of a microobjective, it is possible for a concave mirror or a mirror lens to be attached to the object for forming the image of the slit 3 in the range of the beam splitting surface 9. In either case, the arrangement produces a displacement of the image corresponding to the tilting or lateral displacement of the object. Where objective lenses 6 and 36 are employed they may be composite lenses.

The measuring range for the apparatus described with reference to FIG. 1 or 3 is determined by the focal length of the objective or the scale of the image and the width of the slit 3. The slit 3 may be adjustable.

If it is desired to use only one photoelectric cell, the arrangement is such that the reception channels 11 and 12 are sensed alternately. In this case the differential amplifier forms the difference of successive impulses from the cell, whilst the summing amplifier serves to maintain constant the mean impulse level of this cell. In the case of phase-sensitive rectification, the useful signal for the length or angular measurement is obtained from the amplitude of the fundamental wave in the signal flux.

Again, the summing amplifier 23 may be employed to regulate the brightness of the lamp in such a way that the output signal of the differential amplifier 20 has an amplitude representing a definite current density or voltage when the entire slit image 8 is directed to one of the two reception channels 11 or 12. It is also possible to control the differential amplifier direct from the summing amplifier 23, as hitherto described so that the output signal of the amplifier has a constant gradient of the characteristic 31.

What is claimed is:

1. A photoelectric apparatus for determining the lateral or angular displacement of an object, comprising
   a. means for projecting an image of a slit onto the object of which the displacement is to be determined;
   b. a reflector attached to the object on which reflector the slit image is projected;
   c. a beam splitting device for directing the reflected slit image into two reception channels according to the position of incidence of the reflected image on the beam splitting device;
   d. photoelectric means associated with each reception channel responsive to the light intensity entering each channel;
   e. a summing amplifier and
   f. a differential amplifier, both amplifiers connected to the photoelectric means and interconnected with one another in a connection wherein the summing amplifier controls the differential amplifier in a manner such that light of the reflected image arriving entirely in one of the two reception channels, causes the differential amplifier to produce an output signal of predetermined amplitude, and wherein, when the object is displaced, the differential amplifier supplies an output signal discriminator curve having an amplitude which corresponds to the displacement of the object in a manner such that throughout the measuring range the steepness of the discriminator curve at the output terminal of the differential amplifier is always constant.

2. A photoelectric apparatus as claimed in claim 1, wherein the photoelectric means comprises a photoelectric cell allocated to each reception channel.

3. A photoelectric apparatus as claimed in claim 1, wherein the photoelectric means comprises a single photoelectric cell alternately allocated to each reception channel.

4. A photoelectric apparatus as claimed in claim 1, wherein the summing amplifier controls an illumination source of the projecting means in a manner such that the amplitude of the output signal of the summing amplifier remains constant.

5. A photoelectric apparatus as claimed in claim 1, wherein the projecting means comprises an illumination source, a condenser lens and an objective lens arranged for projecting the slit image onto the reflector, the slit being arranged between the condenser lens and the objective lens.

6. A photoelectric apparatus as claimed in claim 5, wherein the objective lens provided in the projecting means and the reflector are arranged for autocollimation.

7. A photoelectric apparatus as claimed in claim 5, wherein a beam divider is arranged between the slit and the objective lens for directing the reflected slit image onto the beam splitting device.

8. A photoelectric apparatus as claimed in claim 7, wherein the beam divider is a polarizing divider, and an optical polarizing component which rotates the polarization of the slit image through 90° is arranged in the image path between the beam divider and the reflector.

9. A photoelectric apparatus as claimed in claim 8, wherein the optical polarizing component comprises a λ/4 plate.

10 A photoelectric apparatus as claimed in claim 8, wherein the optical polarizing component comprises a Faraday cell.

11. A photoelectric apparatus as claimed in claim 14, wherein the beam divider comprises a geometrical beam divider.

12. A photoelectric apparatus as claimed in claim 5, wherein the objective lens is a telescope objective and the reflector attached to the object is a plane mirror.

13. A photoelectric apparatus as claimed in claim 5, wherein the objective lens comprises a microobjective and the reflector attached to he object comprises a part-spherical mirror.

14. A photoelectric apparatus as claimed in claim 5, wherein the reflector comprises a concave mirror which serves at the same time as an objective forming the image of the slit.

15. A photoelectric apparatus as claimed in claim 5, wherein the reflector comprises a mirror lens which serves at the same time as an objective forming the image of the slit.